July 29, 1958 — W. WATERMAN ET AL — 2,845,086
FLOW REGULATORS
Filed May 19, 1953

INVENTORS
WILLIAM WATERMAN &
DONALD A. STARK,
BY Roland C. Rehm
ATTORNEY

United States Patent Office 2,845,086
Patented July 29, 1958

2,845,086

FLOW REGULATORS

William Waterman, Wilmette, Ill., and Donald A. Stark, Mentor, Ohio; said Stark assignor to said Waterman Application May 19, 1953, Serial No. 355,940

8 Claims. (Cl. 137—504)

This invention relates to flow regulators, and among other objects aims to provide a simple device with improved regulation characteristics.

The present regulator is particularly adapted for use in regulation flow of fluids under high pressure, e. g. 1000 p. s. i. and higher, wherein the tendency of the fluid to by-pass the regulating element, greatly impairs the regulating characteristics. The regulating or metering device which makes the regulator responsive to variation in pressure, is made separate from the device which throttles the flow of fluid (in response to the control of the metering device), and is located upstream from the throttling device (whereat the tendency to by-pass occurs) so that substantially the entire fluid flow is metered and the effect of leakage is therefore minimized.

The nature of the invention may be readily understood by reference to one device embodying the invention and shown in the accompanying drawing.

Figure 1:
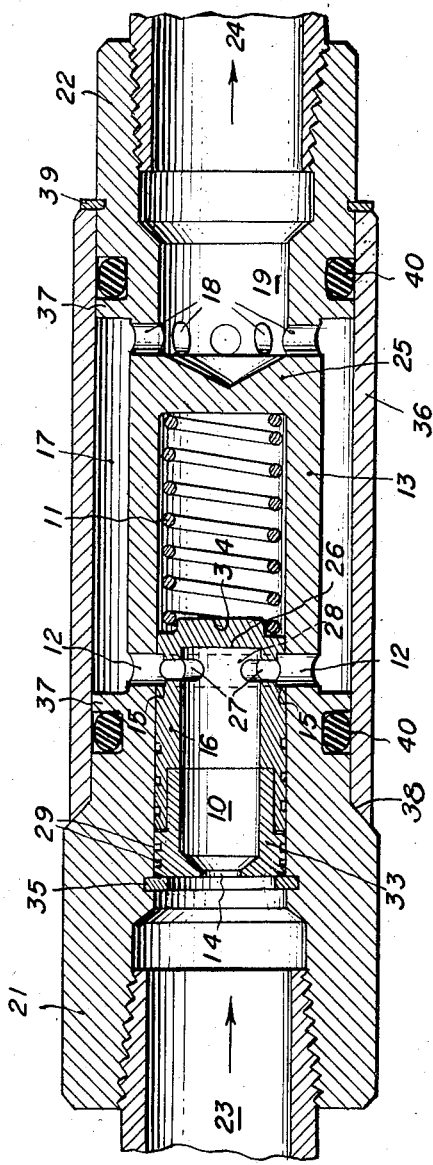
Figure 4:
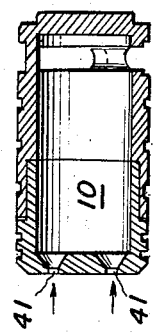
Figure 3:
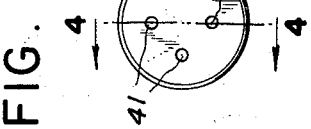
Figure 2:
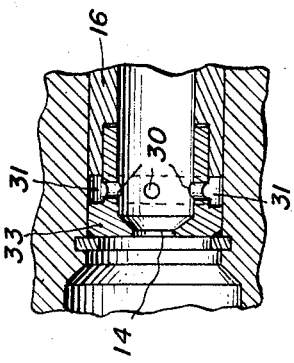

In said drawing:

Fig. 1 is a longitudinal section through a flow regulator and conduits connected thereto; and Fig. 2 is a fragmentary view similar to Fig. 1 but showing a modified construction; and Figs. 3 and 4 are respectively a front elevation and longitudinal section of a piston valve having a plurality of metering orifices arranged out of line of the axis of the stream to eliminate any jet effect on the operation of the regulator.

This application is a continuation in part of our copending application Serial 640,525 filed January 11, 1946 and now abandoned.

Flow regulators are generally employed for maintaining a constant rate of flow under varying pressure conditions. For example, in hydraulic lifting devices the rate of descent of the load (without a flow regulator) would vary with the weight of the load, and heavy loads would descend much to rapidly. Again in machine tools having a hydraulically actuated feed, it is important that the rate of tool feed be uniform despite variations in hydraulic pressure. Such uniform rate of flow is automatically attained by the use of a flow regulating device.

Heretofore flow regulating devices have been unreliable, particularly under high fluid pressure. The causes of faulty operation are not fully understood though various incidents of leakage under high pressure are probably the principal causes. As a practical matter it is difficult to prevent leakage because it is impracticable with production methods to machine to such close tolerances as to reduce or prevent leakage, and it is one of the objects of the invention as embodied in the illustrative flow regulating device to minimize the disturbance of regulation caused by leakage.

As here shown the pressure responsive element in the illustrative flow regulator is in the form of a piston valve 10 (counter-balanced by spring 11) which regulates flow through ports 12 in accordance with pressure conditions, it being understood that, with a constant orifice, the rate of flow normally varies as the square root of the effective pressure, that is the difference between the available fluid pressure and the back pressure. Valve 10 slides in cylinder 13, in which it fits with such reasonable closeness as it is possible to obtain by factory production methods. It is impossible by such methods to prevent substantial leakage, particularly under high pressure, between the valve piston and the walls of cylinder 13. Flow through the regulator enters at orifice 14 arranged transversely of the direction of flow, and leaves through ports 12 which are controlled or throttled by the edge 15 of the piston skirt 16. In this case the flow travels through the annular passage 17 around cylinder 13 and reenters the central passage of the cylinder through ports 18 and leaves through the outlet 19. The terminal fittings 21 and 22 of the regulator (to which conduits 23 and 24 may be connected) are advantageously integral with the body of cylinder 13. The latter has an abutment for spring 11 in the form of a transverse wall 25 closing the end of cylinder 13. The piston skirt is provided with an extension 26 to seat the other end of the spring. Elongated ports 27 in the skirt are located opposite ports 12 and connected by a circumferential groove 28 extending entirely around the piston skirt. One side of the groove provides the edge 15 of the piston skirt which acts to cut off or throttle ports 12.

Orifice 14 is made relatively large compared to the passage through the throttled port or ports 12, thereby to limit the pressure drop occurring at this point (orifice 14) to provide a force (varying approximately as the square of the rate of flow) only sufficient to move the regulating piston against the resistance of spring 11. For example, with a fluid pressure of 3000 p. s. i., the pressure drop at orifice 14 is of the order of 20 p. s. i.; the balance (which may be very great, if the pressure downstream of the regulator be reduced to the order of 100 p. s. i.) occurs at throttled ports 12, but, since the ports are radial, it is ineffective to exert an axial force tending to move the piston. In this connection, it should be understood that pressure against the closed end of the piston is counter-balanced by an equal pressure on its opposite face, arising from leakage past the piston into the remote closed end of cylinder 13 containing spring 11. The force resulting from the pressure drop at orifice 14 compresses spring 11 until the flow is reduced by throttling at ports 12 by the edge 15 of the piston skirt until a state of equilibrium occurs. The tendency of reduction in the effective pressure to reduce flow is immediately checked by spring 11 in returning the piston and uncovering ports 12 to a greater extent until equilibrium is again reached. In other words, the position of the piston is automatically adjusted relative to ports 12 to maintain a constant rate of flow through the line and the regulator despite variations in effective pressure. Thus, in a hydraulic lifting apparatus a heavy load (which produces a high fluid pressure) will nevertheless descend no more rapidly than a light load. Similarly in machine tools the rate of hydraulic flow which determines tool feed will be uniform despite variations in hydraulic pressure or back pressure.

The tendency for flow to by-pass orifice 14 between piston and cylinder wall (and thereby affect regulating characteristics) is minimized because the pressure downstream of orifice 14 is very little less than the up-stream pressure. The substantial pressure drop occurring at the throttled ports 12 is downstream of the space between the piston and cylinder and therefore is ineffective to induce substantial leakage by-passing metering orifice 14.

Circumferential grooves 29 in the piston skirt equalize the pressures around the piston and prevent binding of the piston against the cylinder wall under high fluid pressures. Where the pressure drop through the regulator is high (i. e. several thousand lbs. per sq. in.), the lateral forces acting on the piston may be very high, and if binding of the piston occurs, serious interference in the operation of the regulator would result. By balancing such forces and pressures entirely around the piston skirt, their magnitude has no effect on the proper operation of the regulator. The grooves also interfere with leakage along the piston.

Tendency for flow to by-pass metering orifice 14 may be further minimized by providing holes 30 in the piston skirt just downstream of orifice 14 (see Fig. 2). Holes 30 are advantageously connected by a circumferential passage 31 on the exterior of the piston. The pressure inside the piston and just downstream of orifice 14 is therefore communicated to the exterior of the piston in the region of passage 31. Such downstream pressure being little less than the upstream pressure, there is insufficient pressure difference to cause by-passing leakage around the exterior of the piston and through holes 30. Any flow along the exterior of the piston downstream of holes 30 and passage 31 (where a great pressure difference does exist) will have first passed through metering orifice 14 and have had its effect on the regulating action of the piston.

Adjustment of the regulator may be effected either by varying the characteristics of spring 11 (which is removable) or by varying slightly the size of orifice 14. For the latter purpose, the piston head 33 is made removable from the body of the piston.

Piston 10 is advantageously closed as at 34, downstream of ports 12, creating in effect a dash-pot in conjunction with the closed end of cylinder 13. This prevents chattering or oscillation of the piston (which would otherwise occur because the piston valve is balanced by a resilient element, the spring 11), since fluid can escape and enter cylinder 13 only through the leakage space between the cylinder wall and piston 10.

The illustrative regulator is simple in design and construction and comprises few and simple parts. The piston and its associated parts are held in assembled position simply by a spring ring 35 (which after insertion of the spring, piston, etc. into the cylinder) is snapped in place in a groove inside terminal fitting 21. The annular fluid passage 17 around the cylinder is provided simply by a separate cylinder or sleeve 36 surrounding and spaced from the outer wall of the cylinder and centered thereon by shoulders 37. The sleeve abuts a tapered shoulder 38 on terminal fitting 21 and is held in assembled position by a spring ring 39 which (after assembly of the regulator) is snapped in place in a groove in terminal fitting 22. Appropriate packing in the form of O-rings 40 prevents leakage.

If the entrance to the terminal fitting 21 be reduced by reducers to accommodate a small diameter pipe or conduit, the nozzle effect of the small stream on piston 10 may be eliminated by using a plurality of eccentrically located orifices 41 (instead of a single centrally located orifice 14 through which a small stream might pass as a jet), as shown in Figs. 3 and 4. In the present instance the multiple orifices 41 are formed directly in the piston head. If a plurality of orifices 41 be used, these are preferably spaced radially midway between the center of the piston and its periphery and in any event, offset from or out of line with the axis of the stream flow. By making the edge of the orifices 14 and 41 sharp as here shown, the effect of variations in viscosity of the fluid on the piston, is minimized. In many installations, the hydraulic fluid is maintained at a substantially constant temperature and the effect of viscosity need not be considered. However, in outdoor installations where the temperature of the hydraulic fluid varies with the atmospheric temperature, variations in viscosity would have an effect on the rate of flow. The effect of such variations is minimized by using a sharp edged orifice. Even in outdoor installations after a period of use the hydraulic fluid arrives at a fixed temperature and which thereafter results in a constant rate of flow through the regulator.

Obviously the invention is not limited to the details of the illustrative device since these may be variously modified. Moreover it is not indispensable that all features of the invention be used conjointly since various features may be used to advantage in different combinations and sub-combinations.

Having described our invention, we claim:

1. A flow regulator for high pressure fluids of the order of one thousand pounds per square inch and higher comprising in combination a housing having a cylinder therein, a hollow piston having a metering orifice at its upstream and arranged transversely to fluid flow and having a skirt slidable in said cylinder, the sliding fit between piston and cylinder being loose enough to create the opportunity for leakage between piston and cylinder at said high pressures, a radial outlet port in the wall of said cylinder downstream of the orifice in said piston through which the flow through said regulator passes, said piston skirt being adapted to throttle said radial port, a spring bearing against said piston and cylinder to counterbalance pressure tending to move said piston in the direction of flow through said regulator, the end of said cylinder downstream of said radial port being closed and the downstream end of said hollow piston being closed to provide a dash-pot for damping oscillation of said piston and spring, said piston orifice being substantially large compared to the operative area of said radial port so as to cause only a small pressure drop at said orifice compared to the total pressure drop in the regulator to provide only sufficient force to actuate said piston in response to pressure changes, the major portion of said pressure drop occurring at said radial port in a direction transverse to the piston axis.

2. A flow regulator for high pressure fluids comprising in combination a housing having a cylinder therein, a piston valve having a cylindrical skirt slidable in said cylinder, the sliding fit between valve and cylinder being loose enough to create opportunity to leak under operating pressures of 1000 pounds per square inch and higher, said piston having at its upstream end a metering orifice through which the flow through the regulator passes, a spring bearing against said piston for resiliently resisting movement of said piston in the direction of flow through said regulator, said housing being arranged to admit pressure fluid therein against the orifice end of said piston, a radial exit port in said cylinder throttled by the piston skirt in response to changes in the differential pressure across said piston orifice, the end of said cylinder downstream of said radial port being closed and the downstream end of said hollow piston being closed to provide a dash-pot for damping oscillation of said piston and spring, said metering orifice being relatively much larger than the operative area of said radial port so that only a very small fraction of the total pressure drop through the regulator occurs at said orifice, the major portion thereof occurring at said radial port, whereby the tendency of fluid to by-pass said orifice by passing between the piston valve and cylinder is minimized.

3. A flow regulator comprising in combination a tubular housing having an interior cylindrical passage closed at one end only, a radial port in the wall of the cylindrical passage for flow leaving the latter, a piston having a sliding fit in said passage and controlling said port, a spring bearing against said piston and seated against the closed end of said cylindrical passage for counterbalancing fluid pressure against said piston, a sleeve around said housing and spaced therefrom to provide a passage for flow leaving said port, said housing having an opening downstream of said port and the closed end of said cylinder connecting said passage with the tubular interior of said housing beyond said closed end to provide an escape conduit for said flow, and means sealing said sleeve around said housing beyond said port and said opening to prevent leakage of said flow.

4. A flow regulator comprising in combination a housing having a cylindrical fluid passage therein, a piston having a cylindrical skirt with a sliding fit in said passage, said piston having an orifice in its head for admitting fluid flow, said orifice being designed to produce a pressure drop effective against said piston tending to move it in the direction of flow, a radial exit port in said housing throttled by said piston skirt, resilient means to counterbalance said valve against said pressure drop to regulate flow through said port, a groove around said piston adjacent said orifice, an opening in said piston skirt connecting said groove with the interior of said skirt on the downstream side of said orifice to minimize the tendency of leakage to travel to said exit port between said piston and the walls of said passage, and grooves around said skirt downstream of said opening to distribute leakage pressures around said skirt.

5. A flow regulator comprising in combination a housing having a cylindrical fluid passage therein, a piston having a cylindrical skirt with a sliding fit in said passage, the sliding fit between piston and passage being loose enough to provide the opportunity for leakage along the exterior of said piston, said piston having an orifice in its head for admitting fluid flow, said orifice being designed to produce a pressure drop effective against said piston tending to move it in the direction of flow, a radial exit port in said housing throttled by said skirt, resilient means to counterbalance said piston against said pressure drop to regulate flow through said port, a passage leading from the interior of said piston to the said exterior downstream of said orifice but upstream of said exit port to transmit pressure from the interior of said piston to the exterior to minimize the tendency of leakage to travel to said exit port between said piston and the walls of said passage.

6. A flow regulator comprising in combination a tubular housing having an interior cylindrical passage closed at one end, a radial port in the wall of the cylindrical passage for flow leaving the latter, a hollow piston having a sliding fit in said passage and controlling said port, a metering orifice in said piston to pass flow to its interior and to said port, a spring bearing against said piston and seated against the closed end of said cylindrical passage for counterbalancing fluid pressure against said piston, and a separate sleeve around said housing and spaced therefrom to provide a passage for flow leaving said port, packing adjacent the ends of said sleeve for sealing the same around said housing, said housing having an opening downstream of said port and the closed end of said cylinder connecting said passage with the tubular interior of said housing beyond said closed end to provide an escape conduit for said flow.

7. A flow regulator comprising in combination a valve housing, a slidable hollow piston therein, the sliding fit between piston and housing being loose enough to provide the opportunity for leakage along the exterior of said piston, an orifice in the head of said piston to admit fluid to said housing and to produce a pressure drop against said piston as a result of flow through said housing, means for counterbalancing said piston against the force of said pressure drop, an exit port throttled by said piston to regulate the flow through said housing, said piston having a passage connecting its interior with the said exterior downstream of said orifice but upstream of said exit port to minimize the tendency of leakage fluid to by-pass said orifice by leaking along the said exterior of said piston.

8. A flow regulator comprising in combination a housing having a cylindrical fluid passage therein, a piston having a cylindrical skirt slidable in said passage, the sliding fit between piston and housing being loose enough to provide the opportunity for leakage along the exterior of said piston, said piston having an orifice in its head for admitting fluid flow, said orifice being designed to produce a pressure drop effective against said piston tending to move it in the direction of flow, an exit port in said housing throttled by said piston skirt, resilient means to counter-balance said piston against said pressure drop to regulate flow through said port, and a passage leading from the interior of said piston to its cylindrical exterior downstream of said orifice but upstream of said exit port to transmit pressure from the interior of said piston to its exterior to minimize the tendency of leakage to travel to said exit port along the said exterior of said piston.

References Cited in the file of this patent

UNITED STATES PATENTS

| | | |
|---|---|---|
| 391,431 | Shoff | Oct. 23, 1888 |
| 2,198,487 | Sisk | Apr. 23, 1940 |
| 2,255,439 | Schmidt | Sept. 9, 1941 |
| 2,512,190 | Waterman | June 20, 1950 |
| 2,646,078 | Adams | July 21, 1953 |